US009896070B2

(12) United States Patent
Rosenbaum

(10) Patent No.: US 9,896,070 B2
(45) Date of Patent: Feb. 20, 2018

(54) STEERING WHEEL SQUEEZE-ACTIVATED VEHICLE BRAKING SYSTEM

(71) Applicant: Redevex Corporation, Birmingham, MI (US)

(72) Inventor: Richard W. Rosenbaum, Bloomfield Hills, MI (US)

(*) Notice: Subject to any disclaimer, the term of this patent is extended or adjusted under 35 U.S.C. 154(b) by 336 days.

(21) Appl. No.: 13/763,753

(22) Filed: Feb. 11, 2013

(65) Prior Publication Data

US 2014/0224600 A1    Aug. 14, 2014

(51) Int. Cl.
*B60T 7/08*     (2006.01)
*B60T 13/74*    (2006.01)
*B62D 1/04*     (2006.01)
*B62D 1/06*     (2006.01)

(52) U.S. Cl.
CPC ............ *B60T 7/085* (2013.01); *B60T 13/741* (2013.01); *B62D 1/046* (2013.01); *B62D 1/06* (2013.01)

(58) Field of Classification Search
CPC ....... B60T 7/085; B60T 13/741; B62D 1/046; B62D 1/06
USPC ................. 188/158; 303/20; 701/36, 70, 96; 340/425.5, 468, 576
See application file for complete search history.

(56) References Cited

U.S. PATENT DOCUMENTS

| | | | | |
|---|---|---|---|---|
| 6,114,949 A | * | 9/2000 | Schmitz et al. | 340/425.5 |
| 6,218,947 B1 | * | 4/2001 | Sutherland | 340/576 |
| 6,731,925 B2 | * | 5/2004 | Naboulsi | 455/345 |
| 7,019,623 B2 | * | 3/2006 | Klausner et al. | 340/425.5 |
| 7,468,656 B1 | * | 12/2008 | Frank | 340/468 |
| 7,649,278 B2 | * | 1/2010 | Yoshida et al. | 307/9.1 |
| 7,841,673 B2 | * | 11/2010 | Szczerba et al. | 303/20 |
| 2003/0083797 A1 | * | 5/2003 | Yokoyama et al. | 701/70 |
| 2005/0067889 A1 | * | 3/2005 | Chernoff et al. | 303/20 |
| 2009/0281704 A1 | * | 11/2009 | Otake | 701/96 |
| 2011/0224875 A1 | * | 9/2011 | Cuddihy et al. | 701/42 |
| 2012/0232751 A1 | * | 9/2012 | Guspan | 701/36 |
| 2012/0318097 A1 | | 12/2012 | Ricci et al. | |

FOREIGN PATENT DOCUMENTS

| | | | | |
|---|---|---|---|---|
| DE | 19927464 A1 | * | 12/2000 | |
| EP | 1847429 | | 10/2007 | |
| JP | 05345569 A | * | 12/1993 | |
| JP | 09058426 A | * | 3/1997 | |
| WO | WO-2001066392 | | 9/2001 | |
| WO | WO-2009114877 | | 9/2009 | |

* cited by examiner

*Primary Examiner* — Thomas J Williams
*Assistant Examiner* — Mariano Sy
(74) *Attorney, Agent, or Firm* — John G. Posa; BELZER PC

(57) ABSTRACT

A brake-by-wire vehicle braking system is augmented with "squeeze" sensors placed in the steering wheel of the vehicle enabling a vehicle operator to stop the vehicle more quickly in an emergency situation by eliminating the significant times that it takes to move a driver's foot from the accelerator to the brake pedal and then depress the brake pedal. An important objective is to achieve a faster vehicle stop by allowing the driver to optionally eliminate foot movement from the accelerator pedal to the brake pedal and also the depression of the brake pedal. This invention also potentially allows a driver to squeeze a steering wheel to slow a vehicle, perhaps to comply with a lower speed limit, or accomplish the fastest possible "hard-stop" in an emergency situation.

14 Claims, 3 Drawing Sheets

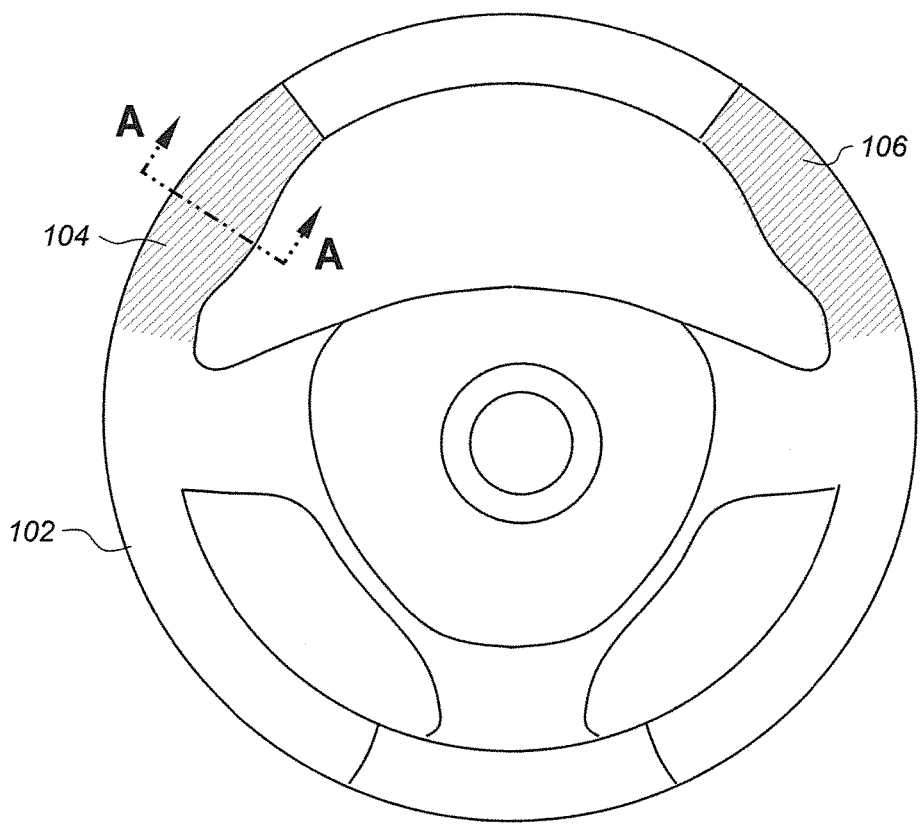
Fig - 1
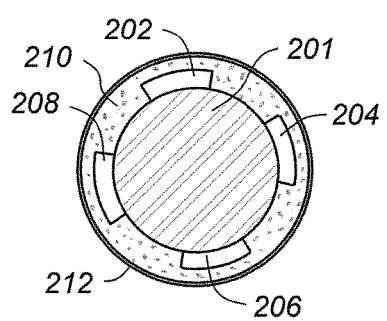
Fig - 2
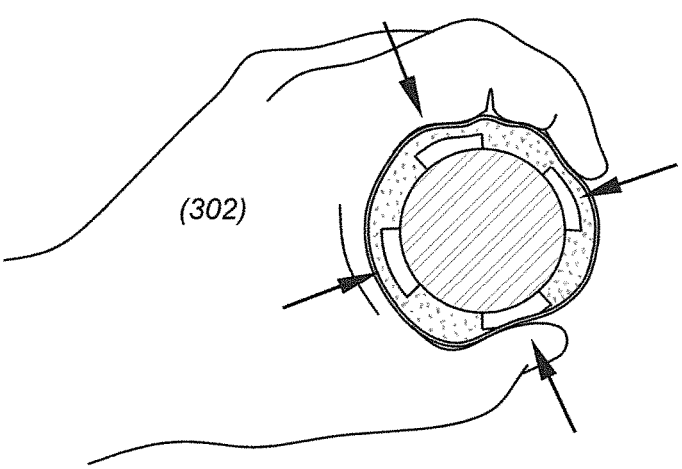
Fig - 3 (A-A)

STEERING WHEEL SQUEEZE-ACTIVATED VEHICLE BRAKING SYSTEM

FIELD OF THE INVENTION

This invention relates generally to motor vehicle braking and, in particular, to a braking system operated by squeezing a vehicle's steering wheel.

BACKGROUND OF THE INVENTION

A vehicle traveling 60 miles per hour (MPH) moves 88 feet per second. In just one-tenth of a second at this speed, a vehicle travels 8.8 feet, which may be the difference between life and death in an accident event.

Typically in a vehicle, there is no connection between the steering wheel or its column and the braking system, unless the vehicle has special equipment installed to accommodate a handicapped driver. Historically, there has been a physical linkage between a brake pedal and a car's master cylinder. The brake pedal works as a force multiplying lever and uses this leverage to transfer the effort from the driver's foot to the master cylinder. The more quickly the master cylinder receives a "brake" signal, the faster a vehicle can be brought to a stop. However, the vehicle operator must 1) move his/her foot from the accelerator to the brake pedal, and then 2) depress the brake pedal a variable distance to physically engage the master cylinder to slow or stop the vehicle. Each of these motion activities requires a variable quantity of time.

With manual braking, the brake pedal uses leverage to transfer the effort from the driver's foot to the master cylinder. Different lever designs can alter the effort the driver needs to make, by using different levels of mechanical advantage. Brake pedals should be mounted securely, free from any excessive sideways movement, and at a height and angle that will allow the driver to quickly move from pressing the accelerator, or gas pedal, to applying the brakes.

The pedal is usually suspended from a bracket between the dash panel and the firewall, and works as a force-multiplying lever. If the power assist fails, the pedal's leverage is designed to allow the driver to still generate thousands of pounds of pressure at each wheel cylinder. Brake pedals must be free to return to their starting positions when pressure is removed. This allows the master cylinder pushrod to return to its un-depressed position.

Changes to how far the pedal can travel or to its resistance—if it feels harder or softer than normal—can be an indicator of problems such as low fluid levels or even a leak in the hydraulic system. When ABS brakes are activated during heavy braking, the pulsations of the system can be felt by the driver through the pedal and this is normal, however, a pulsating feel during normal or light braking can also be an indicator of a potential braking system problem.

Different brake lever designs and "power assist" developments have reduced the physical effort required by the driver on many vehicles. Certain newer vehicles may have an electronic linkage between the brake pedal and the master cylinder, which is sometimes described as a "brake-by-wire" system. An electronic braking system (EBS) utilizes electronics for the control side of the vehicle's braking system. An electronic signal replaces the air signal sent by the brake pedal to activate the brakes, improving stopping distances and braking system performance. The (EBS) introduced by Meritor WABCO is a brake-by-wire system that integrates anti-lock braking system (ABS) technology, automatic traction control (ATC) and other key vehicle control system features.

Vehicle braking systems have been disclosed which involve interactions with the steering wheel. EP 1263633 B1, for example, describes an apparatus comprising a brake actuating member mounted to the vehicle within hand reach of a driver. Strain gages are in communication with the brake actuating member, and a processing unit is connected to the strain gages for receiving input therefrom and for proportionally power-assisting the brake system of the vehicle. The driver, by exerting varying pressure by hand on the brake actuating member, controls the braking of the vehicle. In all embodiments, however, the vehicle operator physically moves a portion of the steering wheel or a paddle control mounted on the steering wheel. Such mechanisms are no more intuitive than moving one's foot onto a brake pedal, such that precious time may be wasted in an emergency.

Systems have also been described wherein parts of a steering wheel are "squeezed" to effectuate certain vehicular controls. Published U.S. Application No. 2012/0232751, for example, teaches operational controls including turn signal activation and deactivation, headlight brightening or dimming, windshield wiper activation and speed, and cruise control functions. In each case, portions of the steering wheel are "squeezed," but there is no suggestion whatsoever regarding vehicle braking. Indeed, although the examples refer to sensing locations placed on the steering wheel, such locations could be placed at other locations in or on the vehicle where pressure may be applied by an operator (e.g., on a parking brake lever, a shift lever, a door handle, etc.). The reference clearly only anticipates control associated with vehicle movement as opposed to vehicle braking.

SUMMARY OF THE INVENTION

This invention resides in a brake-by-wire vehicle braking system augmented with "squeeze" sensors placed in the steering wheel of the vehicle. The system and method allow a vehicle operator to stop his or her vehicle more quickly in an emergency situation by eliminating the significant times that it takes to move a driver's foot from the accelerator to the brake pedal and then depress the brake pedal. An important objective is to achieve a faster vehicle stop by allowing the driver to optionally eliminate foot movement from the accelerator pedal to the brake pedal and also the depression of the brake pedal. This invention also potentially allows a driver to squeeze a steering wheel to slow a vehicle, perhaps to comply with a lower speed limit, or accomplish the fastest possible "hard-stop" in an emergency situation.

When interfaced to an existing electronic braking system (EBS) in a motor vehicle, the system comprises a steering wheel and one or more pressure or force sensors supported on the steering wheel to slow or stop the vehicle in response to an operator's squeezing of the wheel without pulling or pushing on the steering wheel itself. In the preferred embodiment, one or more of the pressure or force sensors are supported on the underside. The sensors are preferably piezoresistive sensors, though capacitive, electromagnetic, piezoelectric, optical or potentiometric sensors may alternatively be employed. Where the vehicle includes a brake pedal, squeezing on the steering wheel may be used to initially slow or stop the vehicle until a signal from the brake pedal is received by the EBS, at which time the operator's use of the brake pedal begins to dominate the braking of the vehicle.

An electronic braking system (EBS) constructed in accordance with the invention includes a plurality of human-machine interface (HMI) braking inputs, an electronic control unit (ECU), and one or more communications networks interfacing the HMI braking inputs and the ECU to a plurality of electronic calipers, each caliper being associated with a wheel of the vehicle. Each electronic caliper in turn includes a processor and an actuator, each processor being operative to receive and interpret signals from the HMI inputs and ECU to slow or stop the vehicle by delivering a braking signal to the actuator. In contrast to existing EBS configurations, the HMI braking inputs include a brake pedal and one or more pressure or force sensors supported on the steering wheel that operate in response to an operator's squeezing of the wheel without pulling or pushing on the steering wheel itself.

The processor(s) are programmed for fault tolerance, redundancy and various modes of operation. For example, each processor may be operative to control a respective actuator to reduce the speed of the vehicle by a predetermined amount in response to an initial moderate squeeze on the steering wheel. Each processor may be operative to control a respective actuator to progressively reduce the speed of the vehicle in response to multiple squeezes on the steering wheel. Each processor is operative to control a respective actuator to bring the vehicle to a gradual and complete stop in response to a consistent firm squeeze on the steering wheel, or to rapidly stop the vehicle in response to a sudden extreme squeeze of the steering wheel. The system may further include a front-viewing video camera interfaced to one of the communications networks enabling the system to bring the vehicle to a smooth and gradual stop based upon the distance to other vehicles or obstacles in front of the vehicle.

BRIEF DESCRIPTION OF THE DRAWINGS

FIG. 1 is a drawing that shows a steering wheel and squeeze sensors positioned in strategic locations on a steering wheel;

FIG. 2 is a cross section of a steering wheel and pressure sensors placed around the circumference of the wheel;

FIG. 3 is a simplified drawing showing a steering wheel being squeezed and the way in which the pressure sensors are affected;

DETAILED DESCRIPTION OF THE INVENTION

Figure 4:
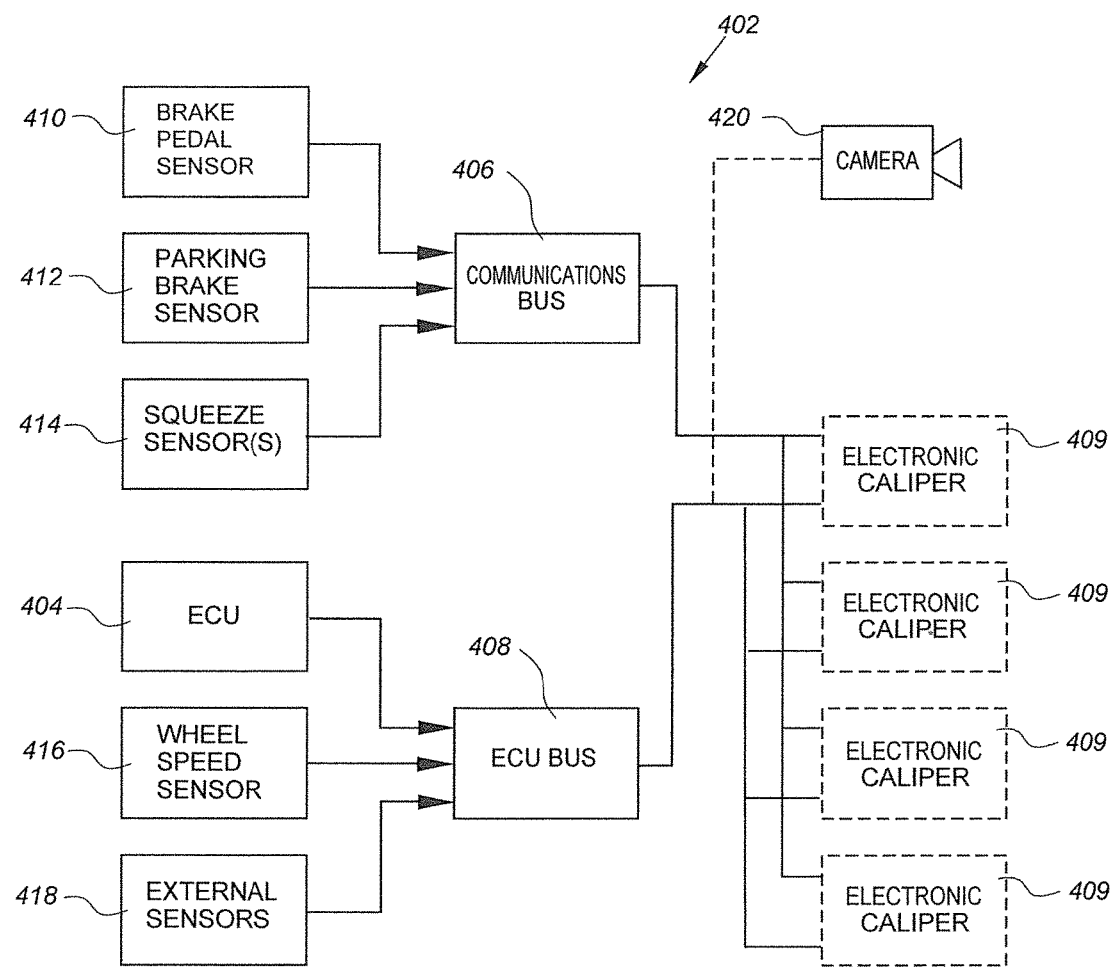
FIG. 4 is a schematic of an electronic braking system to which the squeeze-activated control is applicable.

In accordance with this invention, the driver of a vehicle optionally "squeezes" the steering wheel to slow and/or to stop the vehicle. The driver does not in any way "push" or "pull" the steering wheel in any direction. FIG. 1 is a drawing that shows a steering wheel 102 with squeeze sensors placed in the "10 and 2" positions 104, 106 on the wheel. Although sensors are shown in these two positions it should be understood that other regions of the steering wheel may be instrumented, including the entire steering wheel.

In the preferred embodiment, multiple sensors are at least placed throughout the underside of the steering wheel (i.e., position 206 in FIG. 2) because the majority of experts no longer recommend grasping the wheel at the traditional "10" and "2" positions due to potentially serious damage to the driver's hand during inflation of the air bag located within the steering wheel. Indeed, auto manufacturers frequently include or exclude special grips, dividers or rests to encourage or discourage the use of certain locations for grasping a steering wheel. With multiple sensors inside all areas of the steering wheel's underside, a driver can optionally engage and control the braking system by squeezing the wheel from any orientation.

Whatever positions are discussed, the typical recommendation is that the driver should grasp the wheel firmly. FIG. 2 is a cross section of the steering wheel 210 showing pressure sensors 202, 204, 206, 208 placed around the circumference of the rigid core 201 of the wheel. An outer padding is shown at 212. FIG. 3 is a simplified drawing showing a steering wheel being squeezed and the way in which at least some of the pressure sensors are affected. Although four sensors are depicted in FIGS. 2, 3, more or fewer may be used, including a continuous force-sensing layer depending upon the chosen pressure/force sensor technology.

Various sensor technologies may be used, including piezoresistive, capacitive, electromagnetic, piezoelectric, optical and potentiometric arrangements. In the preferred embodiment, piezoresistive strain gauges are used to detect the pressure applied to the instrumented sections of the steering wheel. Common piezoresistive technologies include thin and thick films using silicon, bonded metal foils, and other material combinations known to those of skill in the art. In this embodiment, the strain gauges are connected in a Wheatstone bridge to maximize the output of the sensor and to reduce sensitivity to errors.

Alternative capacitive sensors use a diaphragm and pressure cavity to create a variable capacitor to detect strain due to applied pressure. Common technologies use metal, ceramic, and silicon diaphragms. Electromagnetic sensors measure the displacement of a diaphragm by means of changes in inductance (reluctance), LVDT, Hall Effect, or by eddy current principle. Piezoelectric sensors exploit the piezoelectric effect in certain materials such as quartz to measure the strain upon the sensing mechanism due to pressure. Optical techniques include the use of the physical change of an optical fiber to detect strain due to applied pressure. Potentiometric sensors use the motion of a wiper along a resistive mechanism to detect the strain caused by applied pressure.

Any squeeze of the wheel will be recognized by the sensors in the steering wheel that are electronically connected to the braking system described with reference to FIGS. 4, 5. In operation, a slight squeeze will begin to slow the vehicle, perhaps by a pre-determined amount, for a lower speed limit. A second slight squeeze further reduces the vehicle's speed. A progressively firm squeeze will bring a vehicle to a gradual and complete stop. A sudden and maximum squeeze will stop the vehicle as quickly and completely as possible.

In large part, recent developments in brake-by-wire technology make possible the present invention through electronic accommodation of the optional squeezing of the steering wheel to supplement or replace use of the break pedal to slow or stop a vehicle. FIG. 4 is a schematic of an electronic braking system to which the squeeze-activated control is applicable. The overall system architecture 402 comprises various processors, including an Electronic Control Unit (ECU) processor and other local processors associated with electronic caliper units 409 described with reference to FIG. 5. The system further includes sensors and actuators that communicate over communication network(s).

In a typical implementation, human-machine interface (HMI) sensors interface to first communications bus 406, whereas electronic control inputs (i.e., non-HMI) sensors interface to a second ECU bus 408. The HMI inputs are derived from the brake pedal and parking brake sensors 410, 412 and, in the case of this invention, squeeze sensors 414. Non-HMI sensors include wheel speed sensor 416 and other external sensors 418. Once the driver inputs a brake command to the system via an HMI input (i.e., the brake pedal and/or steering wheel sensor(s)), four independent brake commands are generated by the ECU, taking into account high-level brake functions such as anti-lock braking system (ABS) or vehicle stability control (VSC). These command signals are sent to the four e-calipers 409 via the communication networks 406, 408.

Figure 5:
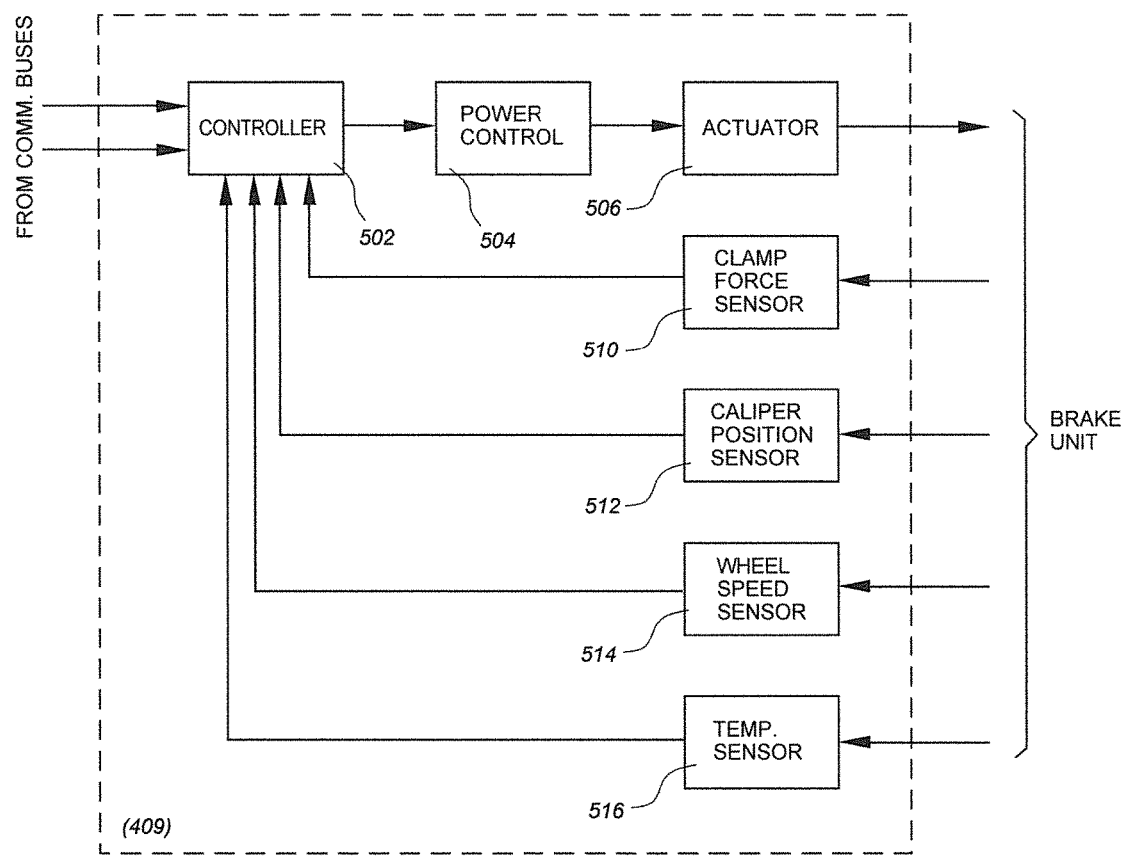
FIG. 5 continues the schematic of FIG. 4 depicting the implementation of electronic calipers.

Now making reference to FIG. 5, each e-caliper 409 includes a controller 502 that receives brake commands from the HMI units and reference inputs received from the ECU bus. The controller 502 provides drive control commands for a power control module 504 interfaced to a brake actuator 506. In addition to tracking its reference brake command, the e-caliper controller also controls the position and speed of the brake actuator based upon inputs from one or more force, position, speed and temperature sensors 510, 512, 514, 516.

Since a brake-by-wire system is safety critical, fault tolerance is a vitally important characteristic. As such, essential information may be derived from a variety of redundant sources (sensors) or other components such as the brake pedal. Redundant copies of signals that are of particular importance such as displacement and force measurements of the brake pedal and squeeze sensors may be copied by multiple processors in the system. In order to take advantage of the hardware and/or software redundancy, "voting algorithms" may be used to derive results believed to be most reliable and error-free. For example, a voter may be used to fuse the information provided by multiple sensors strategically located in the brake pedal and steering wheel (i.e., the squeeze sensors).

FIG. 4 also depicts the inclusion of an optical front-viewing video camera subsystem 420 interfaced to the ECU bus 408. With a camera, the squeezing system can also be used to slow a vehicle to a completely smooth stop without the usual slight "pull back," and optionally at a predetermined distance behind the vehicle ahead in the same lane. With a system that includes front cameras and sensors, a vehicle may accomplish an uncommonly smooth stop.

The invention claimed is:

1. An operator control configured to interface with an electronic braking system (EBS) in a motor vehicle, comprising:
   a steering wheel having a front side and an underside;
   a plurality of piezoresistive pressure or force sensors supported peripherally around a cross section of the steering wheel, including pressure or force sensors supported on the underside of the steering wheel; and
   whereby an operator's squeezing of the steering wheel, without pulling or pushing either the steering wheel or a steering column, is operative to slow or stop the vehicle.

2. An operator control configured to interface with an electronic braking system (EBS) in a motor vehicle, comprising:
   a steering wheel having a front side and an underside;
   a plurality of pressure or force sensors supported peripherally around a cross section of the steering wheel, including pressure or force sensors supported on the underside of the steering wheel; and
   wherein an initial moderate squeeze on the steering wheel, without pulling or pushing either the steering wheel or a steering column, will begin to slow the vehicle.

3. An operator control configured to interface with an electronic braking system (EBS) in a motor vehicle, comprising:
   a steering wheel having a front side and an underside;
   a plurality of pressure or force sensors supported peripherally around a cross section of the steering wheel, including pressure or force sensors supported on the underside of the steering wheel; and
   wherein multiple squeezes on the steering wheel, without pulling or pushing either the steering wheel or a steering column, progressively reduce the speed of the vehicle.

4. An operator control configured to interface with an electronic braking system (EBS) in a motor vehicle, comprising:
   a steering wheel having a front side and an underside;
   a plurality of pressure or force sensors supported peripherally around a cross section of the steering wheel, including pressure or force sensors supported on the underside of the steering wheel; and
   wherein a consistent firm squeeze on the steering wheel, without pulling or pushing either the steering wheel or a steering column, brings a vehicle to a gradual and complete stop.

5. An operator control configured to interface with an electronic braking system (EBS) in a motor vehicle, comprising:
   a steering wheel having a front side and an underside;
   a plurality of pressure or force sensors supported peripherally around a cross section of the steering wheel, including pressure or force sensors supported on the underside of the steering wheel; and
   wherein a sudden extreme squeeze on the steering wheel, without pulling or pushing either the steering wheel or a steering column, will rapidly stop the vehicle.

6. An electronic braking system (EBS), comprising:
   a plurality of human-machine interface (HMI) braking inputs;
   an electronic control unit (ECU);
   a steering wheel;
   one or more communications networks interfacing the HMI braking inputs and the ECU to a plurality of electronic calipers, each caliper being associated with a wheel of a vehicle;
   each electronic caliper including a processor and an actuator, each processor being operative to receive and interpret signals from the HMI inputs and ECU to slow or stop the vehicle by delivering a braking signal to the actuator; and
   wherein the HMI braking inputs include a brake pedal and a plurality of piezoresistive pressure or force sensors supported peripherally around a cross section of the steering wheel that operate in response to an operator's squeezing of the steering wheel without pulling or pushing either the steering wheel or a steering column.

7. An electronic braking system (EBS), comprising:
   a plurality of human-machine interface (HMI) braking inputs;
   an electronic control unit (ECU);
   a steering wheel;

one or more communications networks interfacing the HMI braking inputs and the ECU to a plurality of electronic calipers, each caliper being associated with a wheel of a vehicle;

each electronic caliper including a processor and an actuator, each processor being operative to receive and interpret signals from the HMI inputs and ECU to slow or stop the vehicle by delivering a braking signal to the actuator;

wherein the HMI braking inputs include a brake pedal and a plurality of pressure or force sensors supported peripherally around a cross section of the steering wheel that operate in response to an operator's squeezing of the steering wheel without pulling or pushing either the steering wheel or a steering column; and wherein each processor is operative to control a respective actuator to reduce the speed of the vehicle by a predetermined amount in response to an initial moderate squeeze on the steering wheel.

8. An electronic braking system (EBS), comprising:
a plurality of human-machine interface (HMI) braking inputs;
an electronic control unit (ECU);
a steering wheel;
one or more communications networks interfacing the HMI braking inputs and the ECU to a plurality of electronic calipers, each caliper being associated with a wheel of a vehicle;
each electronic caliper including a processor and an actuator, each processor being operative to receive and interpret signals from the HMI inputs and ECU to slow or stop the vehicle by delivering a braking signal to the actuator;
wherein the HMI braking inputs include a brake pedal and a plurality of pressure or force sensors supported peripherally around a cross section of the steering wheel that operate in response to an operator's squeezing of the steering wheel without pulling or pushing either the steering wheel or a steering column; and
wherein each processor is operative to control a respective actuator to progressively reduce the speed of the vehicle in response to multiple squeezes of the steering wheel.

9. An electronic braking system (EBS), comprising:
a plurality of human-machine interface (HMI) braking inputs;
an electronic control unit (ECU);
a steering wheel;
one or more communications networks interfacing the HMI braking inputs and the ECU to a plurality of electronic calipers, each caliper being associated with a wheel of a vehicle;
each electronic caliper including a processor and an actuator, each processor being operative to receive and interpret signals from the HMI inputs and ECU to slow or stop the vehicle by delivering a braking signal to the actuator;
wherein the HMI braking inputs include a brake pedal and a plurality of pressure or force sensors supported peripherally around a cross section of the steering wheel that operate in response to an operator's squeezing of the steering wheel without pulling or pushing either the steering wheel or a steering column; and
wherein each processor is operative to control a respective actuator to bring the vehicle to a gradual and complete stop in response to a consistent firm squeeze of the steering wheel.

10. An electronic braking system (EBS), comprising:
a plurality of human-machine interface (HMI) braking inputs;
an electronic control unit (ECU);
a steering wheel;
one or more communications networks interfacing the HMI braking inputs and the ECU to a plurality of electronic calipers, each caliper being associated with a wheel of a vehicle;
each electronic caliper including a processor and an actuator, each processor being operative to receive and interpret signals from the HMI inputs and ECU to slow or stop the vehicle by delivering a braking signal to the actuator;
wherein the HMI braking inputs include a brake pedal and a plurality of pressure or force sensors supported peripherally around a cross section of the steering wheel that operate in response to an operator's squeezing of the steering wheel without pulling or pushing either the steering wheel or a steering column; and
wherein each processor is operative to control a respective actuator to rapidly stop the vehicle in response to a sudden extreme squeeze on the steering wheel.

11. An electronic braking system (EBS), comprising:
a plurality of human-machine interface (HMI) braking inputs;
an electronic control unit (ECU);
a steering wheel;
one or more communications networks interfacing the HMI braking inputs and the ECU to a plurality of electronic calipers, each caliper being associated with a wheel of a vehicle;
each electronic caliper including a processor and an actuator, each processor being operative to receive and interpret signals from the HMI inputs and ECU to slow or stop the vehicle by delivering a braking signal to the actuator;
wherein the HMI braking inputs include a brake pedal and a plurality of pressure or force sensors supported peripherally around a cross section of the steering wheel that operate in response to an operator's squeezing of the steering wheel without pulling or pushing either the steering wheel or a steering column; and
further including a front-viewing video camera interfaced to the one of the communications networks enabling the system to bring the vehicle to a smooth and gradual stop based upon the distance to other vehicles or obstacles in front of the vehicle.

12. A method of braking a motor vehicle, comprising the steps of:
providing a steering wheel instrumented with a plurality of force or pressure sensors positioned peripherally around a cross section of the steering wheel, the force or pressure sensors being interfaced to an electronic braking system;
slowing or stopping the vehicle by squeezing on the force or pressure sensors supported on the steering wheel without pushing or pulling either the steering wheel or a steering column; and
wherein multiple squeezes of the steering wheel progressively reduce the speed of the vehicle.

13. A method of braking a motor vehicle, comprising the steps of:
providing a steering wheel instrumented with a plurality of force or pressure sensors positioned peripherally around a cross section of the steering wheel, the force or pressure sensors being interfaced to an electronic braking system; and slowing or stopping the vehicle by squeezing on the force or pressure sensors supported on the steering wheel without pushing or pulling either the steering wheel or a steering column; and wherein a consistent firm squeeze of the steering wheel brings a vehicle to a gradual and complete stop.

14. A method of braking a motor vehicle, comprising the steps of:

providing a steering wheel instrumented with a plurality of force or pressure sensors positioned peripherally around a cross section of the steering wheel, the force or pressure sensors being interfaced to an electronic braking system;

slowing or stopping the vehicle by squeezing on the force or pressure sensors supported on the steering wheel without pushing or pulling either the steering wheel or a steering column; and wherein a sudden extreme squeeze on the steering wheel will rapidly stop the vehicle.

\* \* \* \* \*